INVENTORS
GEORGE J. WILLER JR.
FREDERICK B. CALLANEN
BY
ATTORNEY

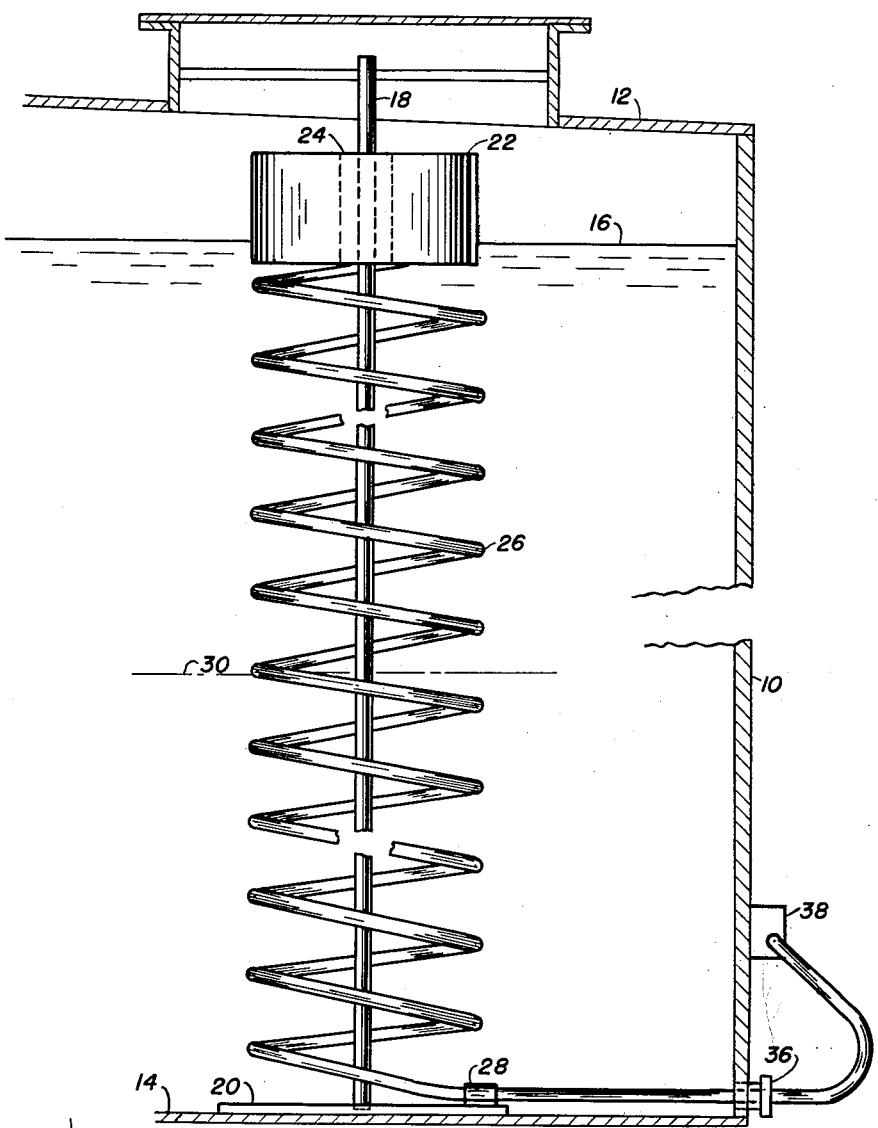
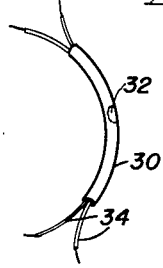
FIG. 1
FIG. 3
INVENTORS
GEORGE J. WILLER JR.
BY FREDERICK B. CALLANEN
ATTORNEY

United States Patent Office 3,111,846
Patented Nov. 26, 1963

3,111,846
TEMPERATURE MEASUREMENT OF
STORED FLUIDS
George J. Willer, Jr., Winnetka, and Frederick B. Callanen, Barrington, Ill., assignors to The Pure Oil Company, Chicago, Ill., a corporation of Ohio
Filed Apr. 22, 1959, Ser. No. 808,153
7 Claims. (Cl. 73—340)

This invention relates to an apparatus for measuring the average temperature of a liquid in a container. More particularly, this invention relates to an apparatus for the measurement of the temperature of stored liquids which are subject to thermally caused changes in volume during the period of storage.

Such conditions occur in the storage of petroleum products. The effluents from oil wells or petroleum-refining processes are commonly fed to storage tanks where they remain until removed for sale or for use in further refining processes. The level of the liquid stored in such tanks is constantly subject to change.

The sale and distribution of petroleum products is most commonly based upon volume, that is, gallons or barrels. Since the volume of a given mass of hydrocarbon varies in proportion to the temperature of the hydrocarbon, it is necessary that the average temperature of the hydrocarbon be accurately ascertainable. Thus, a correction factor may be applied to the measured volume of fluid delivered. Alternatively, a temperature reading may be fed directly to the metering device, which may automatically apply the temperature-compensating factor.

It is a known practice to take a number of point temperature readings, either manually or automatically, at selected depths in a liquid body and average the results obtained. Such point measurements are frequently made by disposing a plurality of temperature-sensing elements, such as thermocouples, within the liquid storage container. The thermocouples are supported by a mechanical apparatus within the tank which is constructed to maintain the thermocouples at the same fractional depth in the liquid, regardless of the fluctuations in the volume or level of the liquid in the container. Such devices include float-supported lazy-tongs, as taught by Pierce, U.S. Patent 2,721,480; or float-supported levers pivotably secured to the bottom of the storage container, as taught by Quist, Patent No. 2,746,293.

Prior art devices have been found to be not entirely reliable or satisfactory. Liquid hydrocarbons commonly contain corrosive materials, sludges, and resinous and gum-forming impurities. Such materials cause corrosion of the moving parts of the thermocouple-supporting apparatus, or congeal and form gummy deposits on the moving parts. In time, the parts become stuck together and free movement is prevented. The apparatus then fails to reflect accurately average temperature conditions in the storage container.

It is an object of this invention to provide an average temperature-sensing device for use in a liquid storage container.

It is a more particular object of this invention to provide an apparatus for measuring the average temperature in a liquid storage container which is economical to construct and is not subject to corrosion or sticking of the working parts of the apparatus.

Briefly, this invention resides in a novel apparatus comprising a coil spring disposed within a liquid storage container, the spring being supported at its upper end by a float, and connected at its lower end to the bottom of the tank. Temperature-sensing devices are disposed along or within, and supported by, the spring. Alternatively, a single temperature-sensing device within the spring itself may extend substantially coextensively with the coils of the spring.

This invention is best described in reference to the drawings, of which:

FIGURE 1 is an elevational view showing the interior of a liquid storage container in which the apparatus of this invention is disposed.

FIGURE 3 is a detailed view showing the disposition of temperature-sensing means within a hollow spring member.

Figure 2:
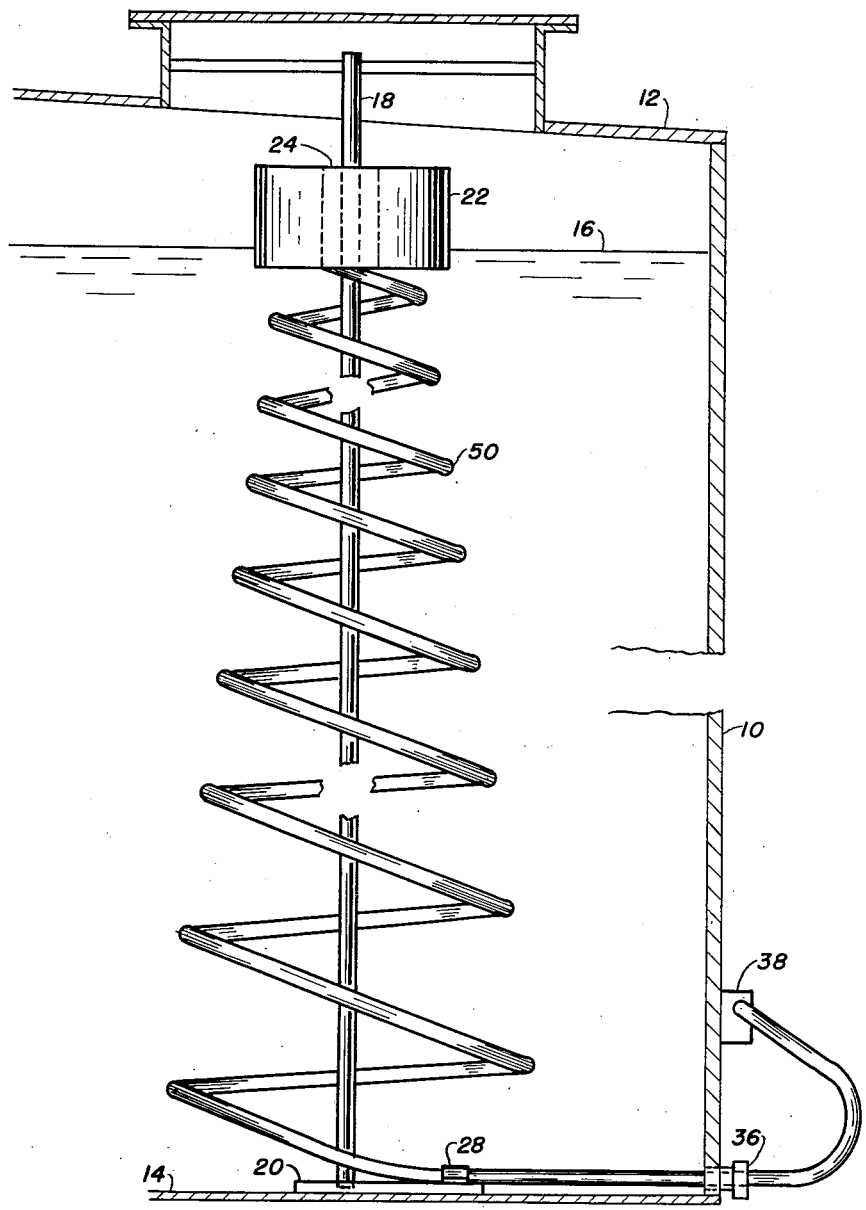
FIGURE 2 shows an alternate spring structure which may be used advantageously in the apparatus of this invention.

Storage tank shell 10 includes a tank roof 12 and a tank bottom 14. The tank is filled with liquid to level 16. Rod or tensioned cable 18 extends vertically from the top of the storage tank to base plate 20, which is fixed to the base of the storage tank. Cable 18 and base plate 20 are preferably fabricated from a corrosion-resistant steel. Float 22 is equipped with an axial hole 24 through which the cable 18 passes. Cable 18 preferably has a diameter of about ¼ inch and hole 24 preferably has a diameter of not less than 1 inch, to allow ample clearance. Float 22 is shown to be disc-like in form, with an outside diameter of about 30 inches and a thickness of about 15 inches. Other shapes are, of course, possible. The float is preferably fabricated from a thin-gauge, light, corrosion-resistant metal, or foamed glass, or a suitably protected plastic. The float should be light and large enough to support a substantial weight. Cylindrical, helical spring 26 is attached to, and supported by the bottom of float 22. The lower end of spring 26 is secured to base plate 20 by a suitable bracket 28. A thermocouple is attached to spring 26 at its midpoint 30. The thermocouple is of the type commonly used in temperature-measurement apparatus and is preferably disposed entirely within the cross-section of the coils of spring 26. Wires 34 extend from thermocouple 32 located at midpoint 30 through the interior of the spring coils to the lower terminus of the spring at bracket 28. The wires then lead across the bottom of the tank through packing gland 36 to temperature meter-recorder 38.

It is evident that as the liquid level in the tank rises or falls, float 22 will rise and fall accordingly. Rod 18 is provided to prevent substantial lateral movement of the float at the liquid level. The inclusion of rod 18 is optional. As float 22 rises and falls, spring 26, which is large, but has a low spring constant, stretches and contracts. The spring constant of spring 26 must be sufficiently small in relation to the weight-carrying capacity of float 22 so that the force applied by the spring will not overcome the buoyancy of the float when the tank is full and the spring is fully extended. The spring, when fully relaxed, will lie on the bottom of the tank with adjacent coils touching each other. The diameter of the spring is preferably about 30 inches, the diameter of the coil cross-section is about ½ inch. For use in a tank having an effective height of 40 feet, the spring should have approximately 50 coils.

It is apparent that as the spring extends or contracts, point 30 at the midpoint of the spring will remain substantially at the midpoint between the liquid level and the bottom of the tank. Other thermocouples may be placed at the ¼ or ¾ depth points along spring 26, and as the spring extends or contracts due to the filling or emptying of the tank, these thermocouples will remain at the same fractional depth. By using a series of thermocouples uniformly spaced along spring 26 it is possible to obtain an accurate approximation of the average temperature of the fluid in the tank. Instead of using thermocouples, other suitable temperature-sensing devices may be employed.

In one embodiment of this invention the thermocouples are replaced with a resistance wire which is disposed along the coils of spring 26. The resistance wires may be disposed within or without the cross-section of the coils, but are preferably located within the coils. The resistance wires preferably run from the bottom of the spring through the center of the coil cross-section to the top of the spring and then back down again to the bottom to complete the circuit. Lead wires of low resistance extend from the bottom of the coil through packing gland 36 to a suitable temperature measuring-recording instrument 38, which measures the average temperature in the tank by measurement of the resistance of resistance wire 40. Wire 40 is preferably fabricated from a material which undergoes a rapid, linear change in resistance with changes of temperature.

Spring 26 can be fabricated from any suitable material, such as aluminum or resilient, non-metallic substances. The coils of the spring are preferably hollow to accommodate resistance wire 40 or thermocouple leads 34. The temperature-sensing devices which may be used can conveniently be protected by enclosing them within the body of the cross-section of the spring coils. To minimize the load on float 22 and prevent sagging of spring 26, the spring is preferably so constructed as to have the same density as the fluid which is to be stored in the tank. Thus, the buoyancy of the spring will equal its weight and there will be no tendency for the spring to sag or rise. Elongation of the spring will then be uniform throughout its length. A spring sensing element may conveniently be fabricated by forming the spring from a suitable plastic material, the resistance elements or thermocouples being molded within the coils of the spring as they are formed. Alternatively, the spring may be fabricated from ½-inch diameter aluminum tubing having a wall thickness of about 0.030 of an inch. The resistance wire or thermocouple temperature-sensing elements may be conveniently disposed within the inside of the aluminum tubing from which the spring is formed. The density of the spring may then be adjusted to equal the density of the fluid which is to be stored within the container. This may be done by filling the spring with a light fluid which will increase the mass of the spring sufficiently to give it a total density equalling that of the stored liquid. Alternatively, the aluminum tubing from which the spring is fabricated may be compressed from its normal circular cross-section to an eliptical cross-section. As the tubing shell 42 is compressed or flattened, the volume of the tube per unit length is decreased, and therefore the density of the tube is increased. It is also possible to select a tubing a greater or lesser wall thickness to arrive at the desired ultimate density.

FIGURE 2 shows an alternate embodiment of this invention in which spring 50 is a helical-conical spring. Spring 50 has a major diameter at its base of about 60 inches and a minor diameter of about 20 inches at float 22. The ½-inch diameter aluminum tubing from which the spring is fabricated need not terminate at bracket 28, but can conveniently be extended along the base of the tank through packing gland 36 to temperature-measuring instrument 38. The aluminum tubing thus serves as an excellent, continuous protector for the lead wires. When the liquid level in the tank reaches a very low point, the coils of helical-conical spring 50 can collapse within each other to form a pancake at the bottom of the tank. This prevents the stacking of the coils one upon each other as would happen if a cylindrical helical spring were used. This advantage of the helical-conical spring becomes important when the tank is completely empty, or almost empty.

The spring constant of a helical-conical spring is not uniform throughout the length of the spring. It is well known in the art that the spring constant or deflection produced per unit stress is proportional to the cube of the diameter of the coils. Therefore, it is desirable to compensate the helical-conical spring to produce a uniform elongation at any given stress. Put another way, it is necessary that the elongation of the spring be uniform throughout its length. Otherwise, a point along the length of the spring, which is at the midpoint of the spring when the fluid level is at the half-way point in the tank, will not necessarily remain at the same proportionate depth when the tank is filled with fluid. The spring constant of a coil spring is determined not only by the diameter of the coils, but also by the area and shape of the coil cross-section. Thus, by using formulae well known in the art, it is possible to adjust the cross-section of the coils of a helical-conical spring to produce a uniform spring constant throughout the length of the spring. While it is possible to use an uncompensated helical-conical spring with good results, especially where the density of the spring is somewhat greater than the density of the fluid in the tank, some error in the positioning of the temperature-sensing elements will occur. It is therefore more desirable to adjust the cross-sectional area or shape of the spring along its length to produce a helical-conical spring having a uniform spring constant. This spring will preferably have the same density as the fluid in which it is immersed. Measurements of the highest accuracy can thus be obtained.

The apparatus of this invention has been described with reference to its preferred embodiment. Various modifications within the spirit of the invention will be obvious to those skilled in the art. For example, springs other than helical, or helical-conical springs, may be used. The cross-section of the spring need not be cylindrical, and the coils themselves may be fabricated from various materials other than aluminum. In general, any readily fabricated, resilient, corrosion-resistant metal is suitable. The spring may also be fabricated from a resilient plastic material, and the temperature-sensing means may be disposed within the cross-section of the spring coils or may be attached to the spring at any desired point along the length thereof.

What is claimed is:

1. An apparatus for measuring the temperature of a liquid in a container, wherein the level of the liquid is subject to change, comprising a float, a helical spring having its upper end fastened to said float and its lower end anchored at the bottom of said container, and a temperature-sensing means distributed substantially uniformly along the length of said spring, said spring and sensing means together having a density closely approximating that of the liquid in said container.

2. An apparatus according to claim 1 in which said spring is a helical-conical spring and the cross-section of said spring is varied along the length thereof to produce a spring having a uniform spring constant.

3. An apparatus in accordance with claim 1 in which the spring is hollow and is filled with a liquid selected to give the spring the required density.

4. An apparatus in accordance with claim 1 in which said float has a vertical passageway extending therethrough, and the apparatus includes a vertical rod secured to the bottom of the container and extending axially within said helical spring and into the passageway in said float.

5. An apparatus for measuring the average temperature of a liquid in a container, wherein the level of the liquid is subject to change, comprising a float, a spring having its upper end fastened to said float and its lower end anchored at the bottom of said container, and a temperature-sensing means distributed substantially uniformly along the length of said spring, said spring and sensing means together having a density closely approximating that of the liquid in said container, said spring being a helical spring, and said sensing means being disposed within said spring.

6. An apparatus for measuring the average temperature of a liquid in a container, wherein the level of the liquid is subject to change, comprising a float, a spring having its upper end fastened to said float and its lower end anchored at the bottom of said container, and a temperature-sensing means distributed substantially uniformly along the length of said spring, said spring and sensing means together having a density closely approximating that of the liquid in said container, said spring being a helical spring, said sensing element being disposed within said spring, said float having a vertical hole extending therethrough, and said apparatus including a vertical rod secured to the bottom of said container extending axially within said helical spring and through the hole in said float.

7. An installation for sensing the average temperature of liquid of predetermined density in a tank, comprising a vertical guide rod, a cable coiled loosely around said guide rod in the form of a helix, said cable having a temperature-sensing wire therein running from the lower end thereof to the upper end and back to the lower end in the form of a loop, leadout connections for said temperature-sensing wire at the lower end of the cable, means for securing the lower end of said cable to a bottom wall of said tank, an annular float loosely surrounding said guide rod and secured to the upper end of said cable for holding the same at the surface of the liquid to be measured, said cable including resilient means tending to hold the convolutions of the cable at uniform pitch and said cable including a medium of lesser density than that of said liquid and having a diameter adapted to cause the cable to displace a volume of said liquid per unit length of the cable equal in weight to the weight of each such length of the cable whereby the cable is substantially weightless when immersed in said liquid and will assume a uniform helix responsive to said resilient means.

References Cited in the file of this patent

UNITED STATES PATENTS

| | | |
|---|---|---|
| 1,312,356 | Reid | Aug. 5, 1919 |
| 2,677,276 | Schmidt | May 4, 1954 |
| 2,721,480 | Pierce | Oct. 25, 1955 |
| 2,741,921 | Windsor | Apr. 17, 1956 |
| 2,746,293 | Quist | May 22, 1956 |